United States Patent [19]
Osborne

[11] Patent Number: 5,779,951
[45] Date of Patent: Jul. 14, 1998

[54] METHOD OF FORMING A VEHICLE WHEEL HAVING INJECTION MOLDED ANNULAR FILLER RING IN WHEEL CAVITY

[75] Inventor: Martin D. Osborne, Ann Arbor, Mich.

[73] Assignee: Hayes Lemmerz International, Inc., Romulus, Mich.

[21] Appl. No.: 779,587

[22] Filed: Jan. 7, 1997

Related U.S. Application Data

[60] Provisional application No. 60/017,573 May 16, 1996.

[51] Int. Cl.⁶ .......................... B29C 44/06; B29C 44/12; B29C 45/16
[52] U.S. Cl. .......................... 264/46.5; 264/46.6; 264/46.9; 264/261; 264/276; 264/313
[58] Field of Search .................. 264/46.9, 46.5, 264/45.2, 313, 276, 46.6, 261

[56] References Cited

U.S. PATENT DOCUMENTS

| | | | |
|---|---|---|---|
| 3,195,601 | 7/1965 | Travers | 264/46.9 |
| 3,854,516 | 12/1974 | Burnell | 264/46.9 |
| 4,000,926 | 1/1977 | Wilcox | 264/46.9 |
| 4,153,657 | 5/1979 | Wilcox | 264/46.9 |
| 4,245,931 | 1/1981 | Watts, Jr. | 264/46.9 |
| 4,251,476 | 2/1981 | Smith | 264/46.9 |
| 4,449,756 | 5/1984 | Weeks . | |
| 4,623,009 | 11/1986 | Seitz et al. . | |
| 4,898,630 | 2/1990 | Kitoh et al. . | |
| 4,963,083 | 10/1990 | Stalter, Sr. et al. | 264/46.9 |
| 5,071,605 | 12/1991 | Kawaguchi et al. | 264/276 |
| 5,591,386 | 1/1997 | Jansen et al. | 264/46.9 |
| 5,634,694 | 6/1997 | Murray et al. | 301/63.1 |
| 5,660,771 | 8/1997 | Dunfee et al. | 264/276 |

FOREIGN PATENT DOCUMENTS

| | | | |
|---|---|---|---|
| 1 579 214 | 12/1971 | Germany | 264/46.9 |
| 25 21 441 | 11/1976 | Germany | 301/37.43 |
| 3503882 | 8/1986 | Germany . | |
| 3632063 | 3/1988 | Germany . | |
| 91/7289 | 5/1991 | WIPO . | |

Primary Examiner—Allan R. Kuhns
Attorney, Agent, or Firm—MacMillan, Sobanski & Todd

[57] ABSTRACT

An improved vehicle wheel construction having an injection molded generally annular filler ring disposed in a radially inwardly facing circumferential cavity of the wheel to prevent material from accumulating in the circumferential cavity of the wheel and causing an out-of-balance wheel condition and method for producing the same is disclosed. The method includes the steps of (a) providing a rim and a disc; (b) securing the rim and the disc together to produce a wheel construction which defines a radially inwardly facing circumferential cavity; (c) positioning the wheel on a carrier; (d) probing the wheel to make sure the wheel is properly positioned on the carrier in a predetermined position and if not, moving the wheel to the predetermined position; (e) inserting a plug through a valve stem opening formed in the wheel (f) moving a mold into engagement with the inner surface of the wheel adjacent the circumferential cavity, the mold including an outer portion formed of a pliable material and having a profile which generally corresponds to the profile of the adjacent surfaces of the wheel, the pliable outer portion of the mold operative to take up any variations in the wheel profile so as to form a seal at the wheel engagement surfaces and thereby isolate the circumferential cavity; (g) injecting a filler material through a passageway formed in the mold; and (h) maintaining the mold in engagement with the inner surface of the wheel adjacent the circumferential cavity until the filler material cures to a non-reactive state and forms an injection molded generally annular filler ring of a generally solid material.

9 Claims, 6 Drawing Sheets

METHOD OF FORMING A VEHICLE WHEEL HAVING INJECTION MOLDED ANNULAR FILLER RING IN WHEEL CAVITY

CROSS-REFERENCE TO RELATED APPLICATIONS

This application claims the benefit of U.S. Provisional Application No. 60/017,573, filed May 16, 1996.

BACKGROUND OF THE INVENTION

This invention relates in general to vehicle wheels and in particular to an improved filler ring for use in a such a vehicle wheel.

Vehicle wheels, such as for automotive and truck applications, can be produced using a variety of materials and construction techniques. For example, to produce a conventional fabricated wheel, a rolled fall rim (which defines both an inboard and an outboard tire bead retaining flange for an associated tire), is welded to a center disc. Depending upon the particular design, the disc can be welded to the rim at various points, including, for example, the area adjacent the outboard tire bead seat. In producing a "full face" type wheel, a "partial" rolled rim is welded to a full center disc whose outer edge forms at least a portion of the outboard tire bead seat retaining flange. The fall center disc can be stamped, cast or forged. Other construction techniques include one-piece casting or forging.

In most vehicle wheel constructions, a radially inwardly facing circumferential cavity or pocket is formed in the wheel area adjacent the outboard tire bead seat. For example, in both the "bead seat" and "fall face" construction the disc and the rim cooperate to define such a cavity. Unfortunately, during vehicle operation, road material or other debris, such as for example, snow, gravel, salt, or mud can enter through windows or openings which are provided in the disc or through an open inboard side of the wheel and accumulate in the cavity. Also, if water is present in the cavity, the water can settle and freeze in a lower portion of the wheel cavity when the vehicle is parked for sufficient time in freezing temperatures. This accumulated material may result in a significant out-of-balance wheel condition. Thus, it would be desirable to provide a wheel construction which prevented such accumulation of material in the cavity to prevent an out-of-balance wheel condition.

BRIEF SUMMARY OF THE INVENTION

This invention relates to an improved vehicle wheel construction having an injection molded generally annular filler ring disposed in a radially inwardly facing circumferential cavity of the wheel to prevent material from accumulating in the circumferential cavity of the wheel and causing an out-of-balance wheel condition and method for producing the same. In particular, the method includes the steps of (a) providing a rim and a disc; (b) securing the rim and the disc together to produce a wheel construction which defines a radially inwardly facing circumferential cavity; (c) positioning the wheel on a carrier; (d) probing the wheel to make sure the wheel is properly positioned on the carrier in a predetermined position and if not, moving the wheel to the predetermined position; (e) inserting a plug through a valve stem opening formed in the wheel (f) moving a mold into engagement with the inner surface of the wheel adjacent the circumferential cavity, the mold including an outer portion formed of a pliable material and having a profile which generally corresponds to the profile of the adjacent surfaces of the wheel, the pliable outer portion of the mold operative to take up any variations in the wheel profile so as to form a seal at the wheel engagement surfaces and thereby isolate the circumferential cavity; (g) injecting a filler material through a passageway formed in the mold, the filler material being a two-part urethane material which is injected through the passageway as a liquid so as to allow the material to freely flow around the circumference of the circumferential cavity and begins an endothermic reaction and expands in the circumferential cavity; and (h) maintaining the mold in engagement with the inner surface of the wheel adjacent the circumferential cavity until the filler material cures to a non-reactive state and forms an injection molded generally annular filler ring of a generally solid material.

Other advantages of this invention will become apparent to those skilled in the art from the following detailed description of the preferred embodiment, when read in light of the accompanying drawings.

DETAILED DESCRIPTION OF THE INVENTION

Figure 1:
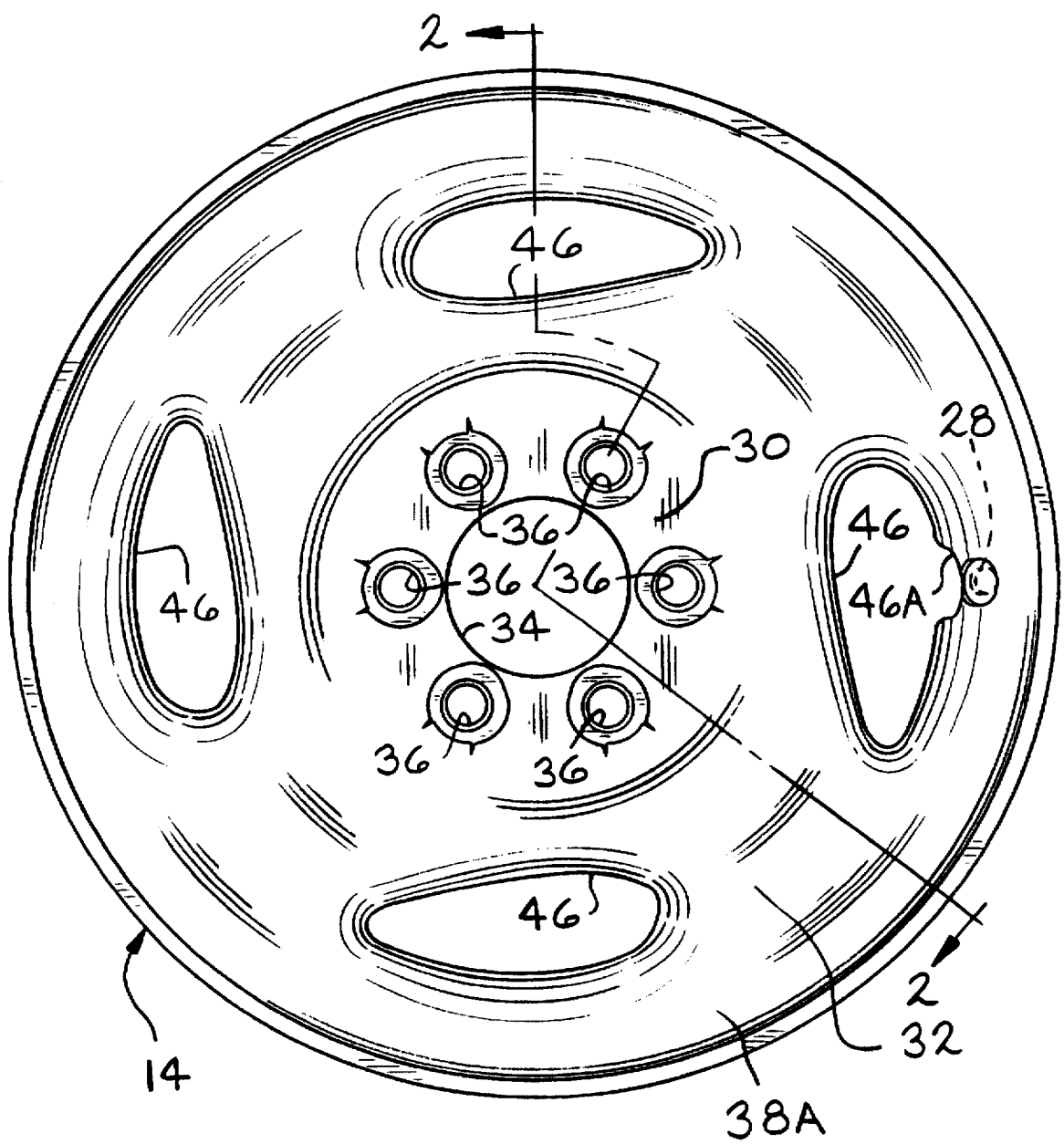
FIG. 1 is a front view of an improved vehicle wheel including an injection molded annular filler ring in a wheel cavity thereof in accordance with this invention with the center cap removed.
Figure 2:
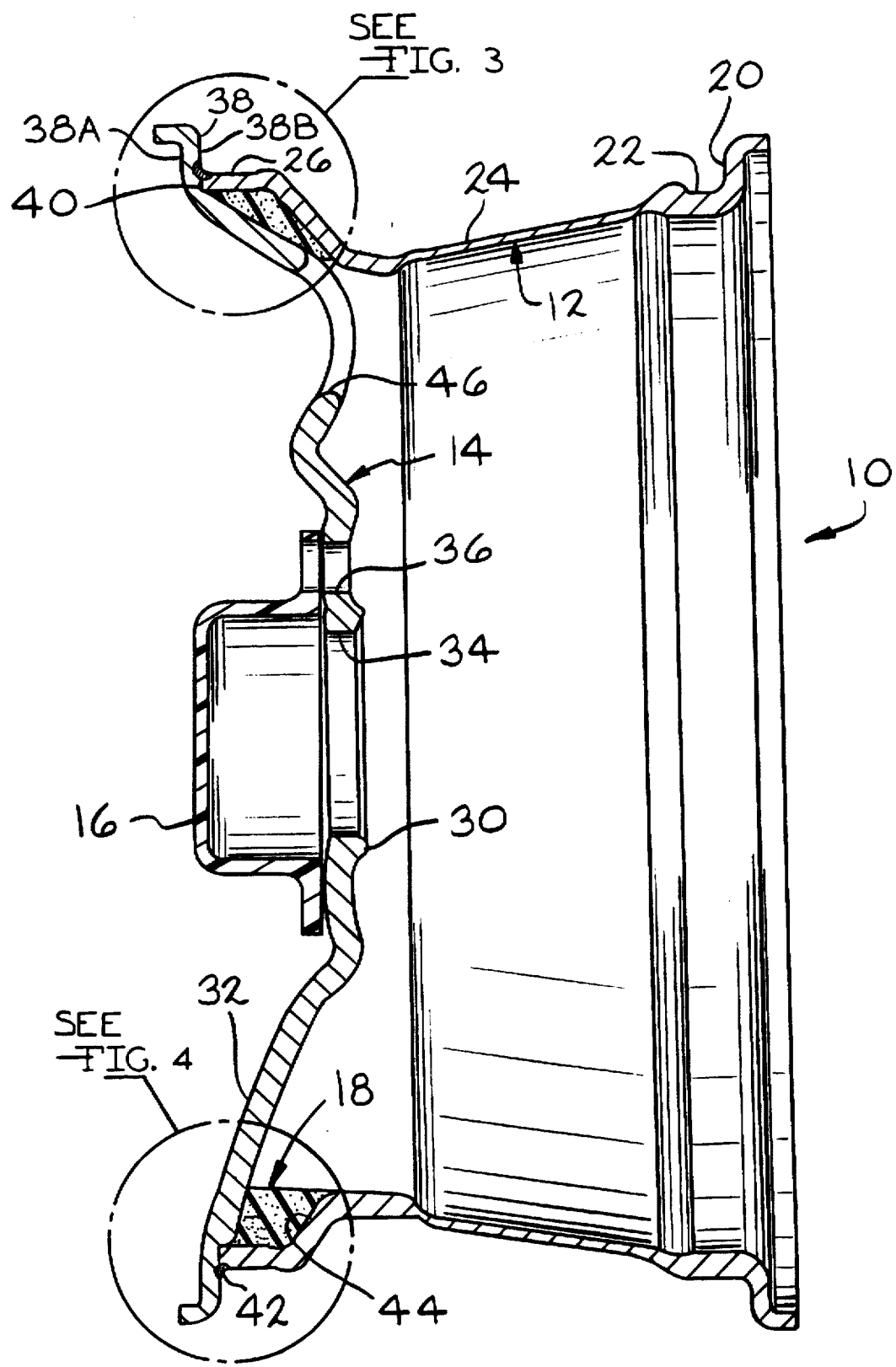
FIG. 2 is a sectional view of the vehicle wheel illustrated in FIG. 1 and showing the annular filler ring in the wheel cavity.
Figure 3:
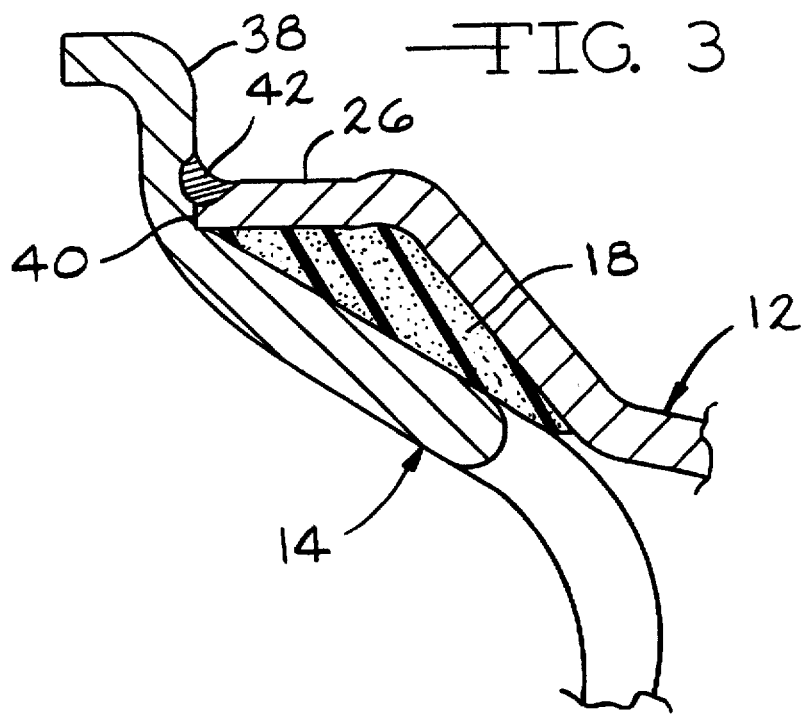
FIG. 3 is an enlarged view of a portion of the vehicle wheel illustrated in FIG. 2.
Figure 4:
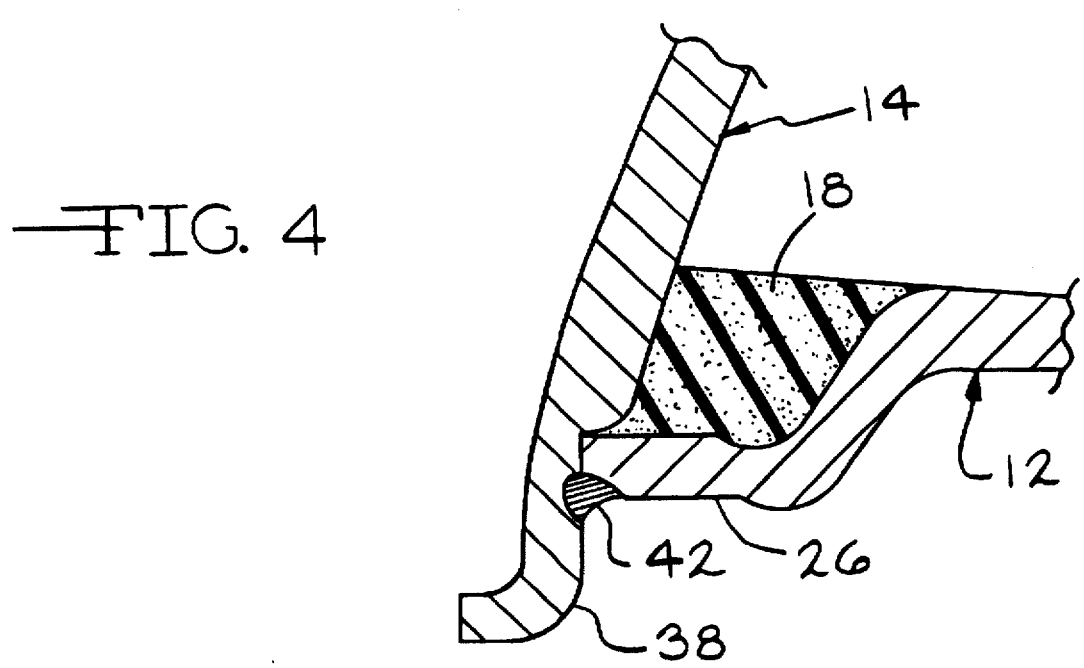
FIG. 4 is an enlarged view of another portion of the vehicle wheel illustrated in FIG. 2.

Referring now to the drawings, there is illustrated in FIGS. 1 and 2 an improved vehicle wheel, indicated generally at 10, in accordance with the present invention. The vehicle wheel 10 shown in this embodiment is a full face fabricated type of wheel, and includes a rim 12, a full face wheel disc 14, a center cap 16, and an injection molded annular filler ring 18. Although this invention is discussed in conjunction with the particular wheel disclosed herein, it will be appreciated that the invention may be used in conjunction with other types of wheel constructions. For example, the vehicle wheel can be a "bead seat attached wheel" construction ,such as shown in FIG. 4 of U.S. Pat. No. 5,188,429 to Heck et al., a "well attached" wheel, such as shown in FIG. 3 of the Heck et al. Patent, a "modular wheel" construction including a partial rim and a full face wheel disc, such as shown in U.S. Pat. No. 5,360,261 to Archibald et al., a "bimetal" wheel construction including an aluminum disc and a steel rim, such as shown in U.S. Pat. No. 5,421,642 to Wei et al., or a "full cast" wheel construction, such as shown in U.S. Pat. No. 5,427,171 to Prieto, all of these patents incorporated herein by reference.

In the illustrated embodiment, the rim 12 is a fabricated rim constructed of aluminum. The rim 12 includes an inboard tire bead seat retaining flange 20, an inboard tire bead seat 22, a generally axially extending well 24, and an outboard tire bead seat 26. The rim 12 further includes an opening 28 formed therein (shown in phantom in FIG. 1), to accommodate a valve stem (not shown). Alternatively, the rim 12 can be otherwise formed and/or can be constructed from other materials, such as for example steel or other suitable alloy materials.

In the illustrated embodiment, the disc 14 is fabricated disc constructed of aluminum. The disc 14 includes a generally centrally located wheel mounting surface 30, and an outer annular portion 32. The wheel mounting surface 30 is provided with a centrally located pilot aperture 34, and a plurality of lug bolt receiving holes 36. The lug bolt receiving holes 36 receive lug bolts (not shown) for securing the wheel 10 on a vehicle axle (not shown). Alternatively, the disc 14 can be forged, cast, or otherwise formed, and/or can be constructed from other materials, such as for example steel or other suitable alloy materials. In the illustrated embodiment, the disc 14 further includes four decorative windows 46 formed in the outer annular portion 32 thereof. As shown in FIG. 1, one of the windows 46 includes a cut-out portion 46A to accommodate the valve stem.

The outer annular portion 32 of the disc 14 defines an outboard tire bead seat retaining flange 38 of the wheel 10, and includes an outer surface 38A and an inner surface 38B. To assemble the wheel 10, an outboard end 40 of the rim 12 is positioned against the inner surface 38B of the disc 14, and a weld 42 is provided to join the disc 14 and rim 12 together as shown in FIG. 2. When the rim 12 and disc 14 are joined together, a radially inwardly facing circumferential cavity or pocket 44 is formed between the inner surface 38B of the disc 14 and an inner surface 26A of the outboard tire bead seat 26 of the rim 12. As will be discussed below, the filler material 18 is provided to fill substantially the entire internal cavity 44 of the wheel 10 and prevent debris from entering and lodging therein and thereby causing an out-of-balance wheel condition.

Figure 5:
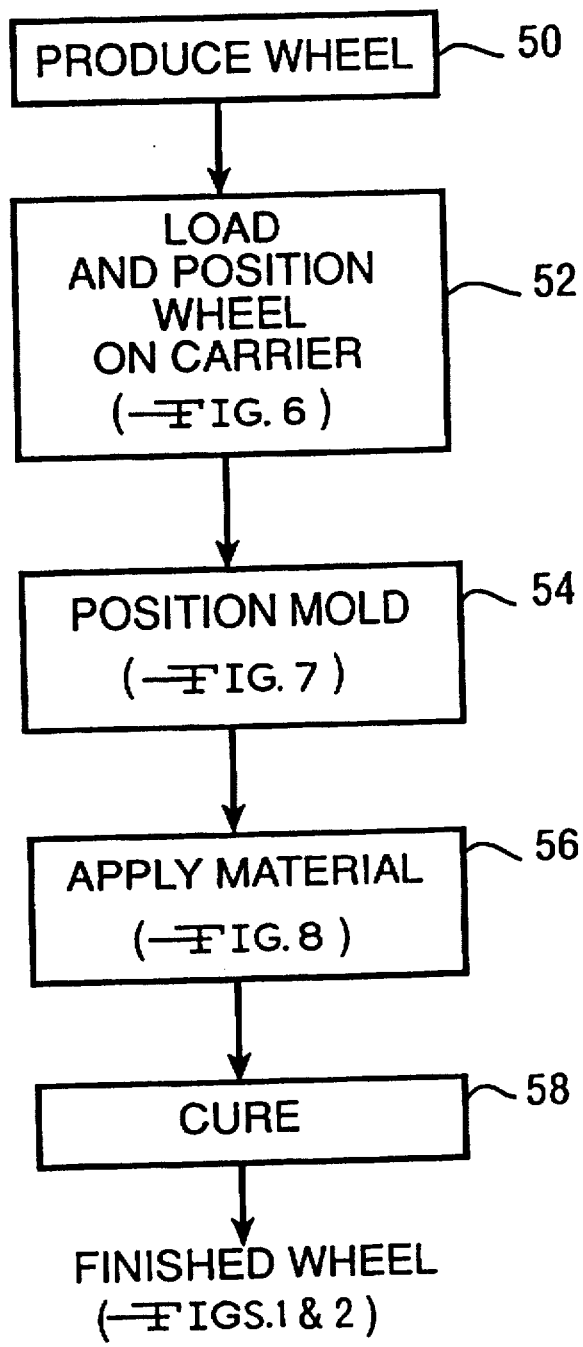
FIG. 5 is a block diagram illustrating a sequence of steps for producing the vehicle wheel of this invention.
Figure 6:
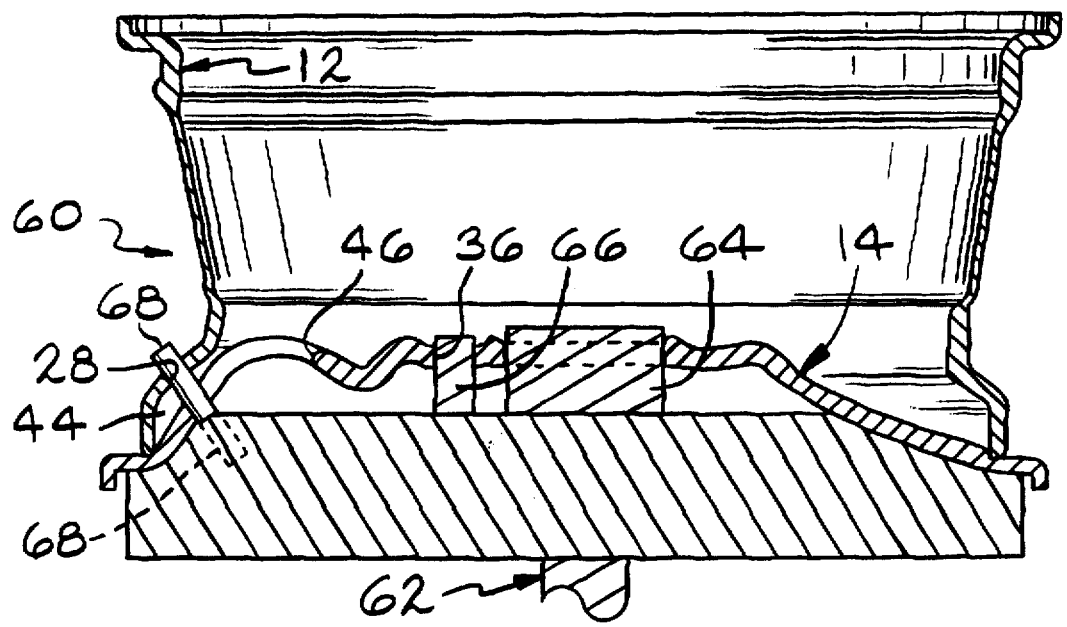
FIG. 6 is a schematic diagram illustrating the step of loading and positioning the vehicle wheel on a vehicle wheel carrier.

Referring now to FIG. 5, there is illustrated a block diagram showing a sequence of steps for producing the vehicle wheel 10 in accordance with this invention. Initially, in step 50 a vehicle wheel, indicated generally at 60 in FIG. 6 is provided. The vehicle wheel 60 is essentially identical to the vehicle wheel 10 except that the wheel 60 is a conventional wheel and does not include the filler material 18.

Next, in step 52, the wheel 60 is loaded and positioned on a wheel support carrier 62 which engages the outer surface of the disc 14, as shown in FIG. 6. In the preferred embodiment, the carrier 62 includes an upstanding center post 64, an upstanding stud 66, and valve stem plug 68. The outer diameter of the post 64 is slightly smaller than the diameter of the pilot aperture 34 formed in the disc 14, and the outer diameter of the stud 66 is slightly smaller than the diameter of the lug bolt receiving hole 44. The stud 66 is provided to enable an operator to load the wheel 60 on the carrier 62 in a predetermined position. In particular, the operator loads the wheel 60 on the carrier 62 with the stud 66 extending through a selected one of the lug bolt mounting holes 36 so that the wheel 60 is supported on the carrier 62 with the valve stem hole 28 in a predetermined location relative to the stud 66.

With the wheel 60 properly positioned on the carrier 62, the valve stem plug 68 of the fixture 62 is actuated and extends through the cut-out portion 46A formed in the disc 14, through the cavity 44, and through the valve stem opening 28 formed in the rim 12. Alternatively, other means can be employed to position the wheel 60 on the carrier 62. For example, the wheel 60 can be rotated by the carrier 62 until a probe (not shown) which is operatively connected to the carrier 62 determines the wheel 60 is in a predetermined position on the carrier. The probe can be adapted to detect the valve stem opening 28 in the wheel 60 in order to properly orient the wheel 60 on the carrier 62. Also, the plug 68 can normally extend from the fixture 62 and be used to properly position the wheel 60 on the fixture 62. In addition, the carrier 68 does not have to include the plug 68.

Figure 7:
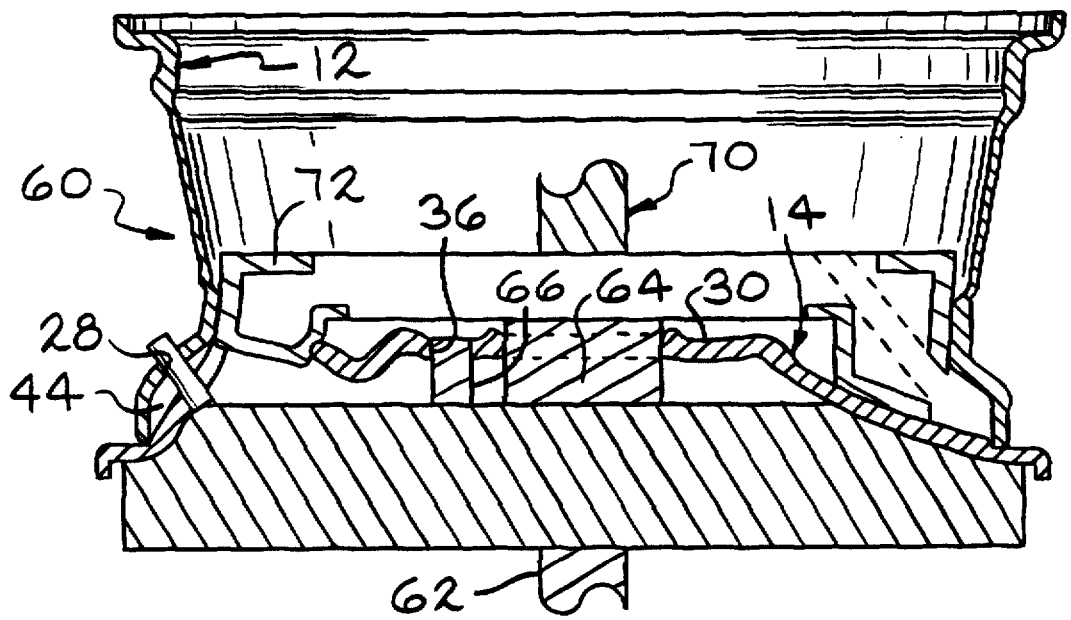
FIG. 7 is a schematic diagram illustrating the step of positioning a mold on the vehicle wheel.
Figure 8:
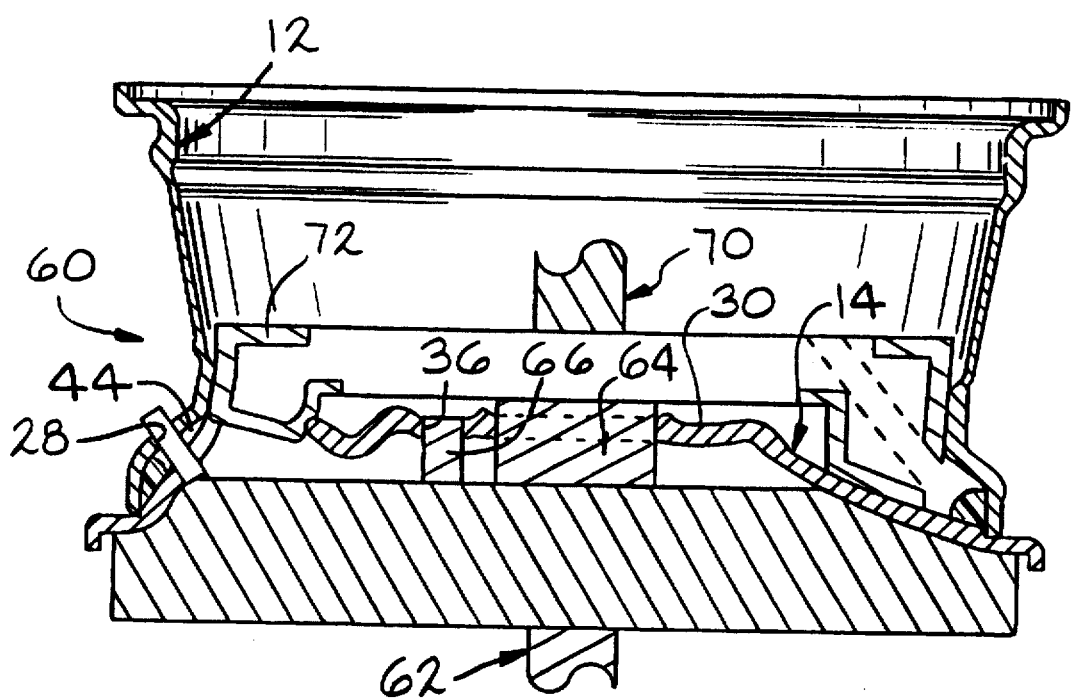
FIG. 8 is a schematic diagram illustrating the step of applying a filler material through a passageway formed in the mold and into the wheel cavity.

Following this, a mold 70 is moved downwardly and engages the inner surface of the mounting portion 30 of the disc 14 during step 54. As shown in FIG. 7, the mold 70 is constructed from a relatively rigid material, such as steel, and includes an outer portion 72 having a pliable material, such as rubber, applied thereon. In particular, the outer portion 72 of the mold 70 has a preformed profile which generally corresponds to the profile of the adjacent surfaces of the wheel 60. Thus, the rubber outer portion 72 of the mold 70 follows the profile of the wheel 60 and is able to take up any variations in the wheel profile so as to form a seal at the wheel engagement surfaces and thereby isolate the cavity 44.

In step 56, a filler material 74 is injected through a passageway 76 formed in the mold 70 and flows completely around the circumference of the internal cavity 44 of the wheel 60. Preferably, the filler material 74 is an two-part urethane material which is injected through the passageway 76 as a liquid so as to allow the material to freely flow around the circumference of the internal cavity 44. One such filler material 74 is a two-part urethane material manufactured by Foamseal, Inc., of Oxford, Mich.

After the filler material 74 flows around the internal cavity 44, the filler material 74 begins an endothermic reaction and expands into the shape shown in FIGS. 2 through 4. As shown therein, the liquid material 74 expands into a generally annular filler ring 18 of a generally solid material. The solid material can be a foam urethane material or an elastomeric urethane material. The mold 70 is maintained in the downward position during curing step 58 until the filler material cures to a non-reactive state to produce the finished vehicle wheel 10.

The time period required for the endothermic reaction and curing of the filler material in step 58 depends upon the particular wheel construction (i.e., the size of the internal cavity 44), and the temperature of the room. In order to increase the reaction and curing time period, heat can be used. Once curing is complete, the mold 70 is moved upwardly and the wheel 10 is lifted off from the carrier 62. Thus, filler ring 18 is effective to fill substantially the entire cavity 44 of the wheel 10 and prevent debris from entering and lodging therein. As a result, an out-of-balance wheel condition cannot be created by debris entering the wheel 10 through the windows 46 of the disc 14 or through the back side of the wheel 10.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A method for producing a vehicle wheel comprising the steps of:
   (a) providing a rim and a disc;
   (b) securing the rim and the disc together to produce a wheel construction which defines a circumferential cavity;
   (c) moving a mold into engagement with an inner surface of the wheel adjacent the circumferential cavity; wherein the mold includes an outer portion formed of a pliable material and having a profile which generally corresponds to the profile of adjacent surfaces of the wheel, the pliable outer portion of the mold operative to take up any variations in the wheel profile so as to form a seal at wheel engagement surfaces and thereby isolate the circumferential cavity;
   (d) injecting a filler material through a passageway formed in the mold into the circumferential cavity; and
   (e) curing the filler material in the circumferential cavity to form an injection molded generally annular filler ring.

2. The method defined in claim 1 and further including the steps of positioning the wheel on a carrier, probing the wheel to make sure the wheel is properly positioned on the carrier in a predetermined position and if not, moving the wheel to the predetermined position.

3. The method defined in claim 1 and further including the step of prior to performing step (d) inserting a plug through a valve stem opening formed in the wheel.

4. The method defined in claim 1 wherein the filler material is a two-part urethane material which is injected through a passageway formed in the mold as a liquid so as to allow the material to freely flow around the circumference of the circumferential cavity and begin an endothermic reaction and expand in the circumferential cavity to form an injected molded generally annular filler ring of a generally solid material.

5. The method defined in claim 4 wherein the solid material is a foam urethane material.

6. The method defined in claim 4 wherein the solid material is an elastomeric urethane material.

7. The method defined in claim 4 and further including the step of maintaining the mold in engagement with the inner surface of the wheel adjacent the circumferential cavity until the filler material cures to a non-reactive state.

8. The method defined in claim 1 wherein step (e) includes using heat to cure the filler material.

9. A method for producing a vehicle wheel comprising the steps of:
   (a) providing a rim and a disc;
   (b) securing the rim and the disc together to produce a wheel construction which defines a circumferential cavity;
   (c) positioning the wheel on a carrier;
   (d) probing the wheel to make sure the wheel is properly positioned on the carrier in a predetermined position and if not, moving the wheel to the predetermined position;
   (e) inserting a plug through a valve stem opening formed in the wheel
   (f) moving a mold into engagement with an inner surface of the wheel adjacent the circumferential cavity, the mold including an outer portion formed of a pliable material and having a profile which generally corresponds to the profile of adjacent surfaces of the wheel, the pliable outer portion of the mold operative to take up any variations in the wheel profile so as to form a seal at wheel engagement surfaces and thereby isolate the circumferential cavity;
   (g) injecting a filler material through a passageway formed in the mold, the filler material being a two-part urethane material which is injected through the passageway as a liquid so as to allow the material to freely flow around the circumference of the circumferential cavity and begins an endothermic reaction and expands in the circumferential cavity; and
   (h) maintaining the mold in engagement with the inner surface of the wheel adjacent the circumferential cavity until the filler material cures to a non-reactive state and forms an injection molded generally annular filler ring of a generally solid material.

* * * * *